Feb. 6, 1934.                    J. F. GIBSON                    1,945,526
                           AUTOMATIC DRY CONCENTRATOR
                           Filed June 29, 1931            4 Sheets-Sheet 1
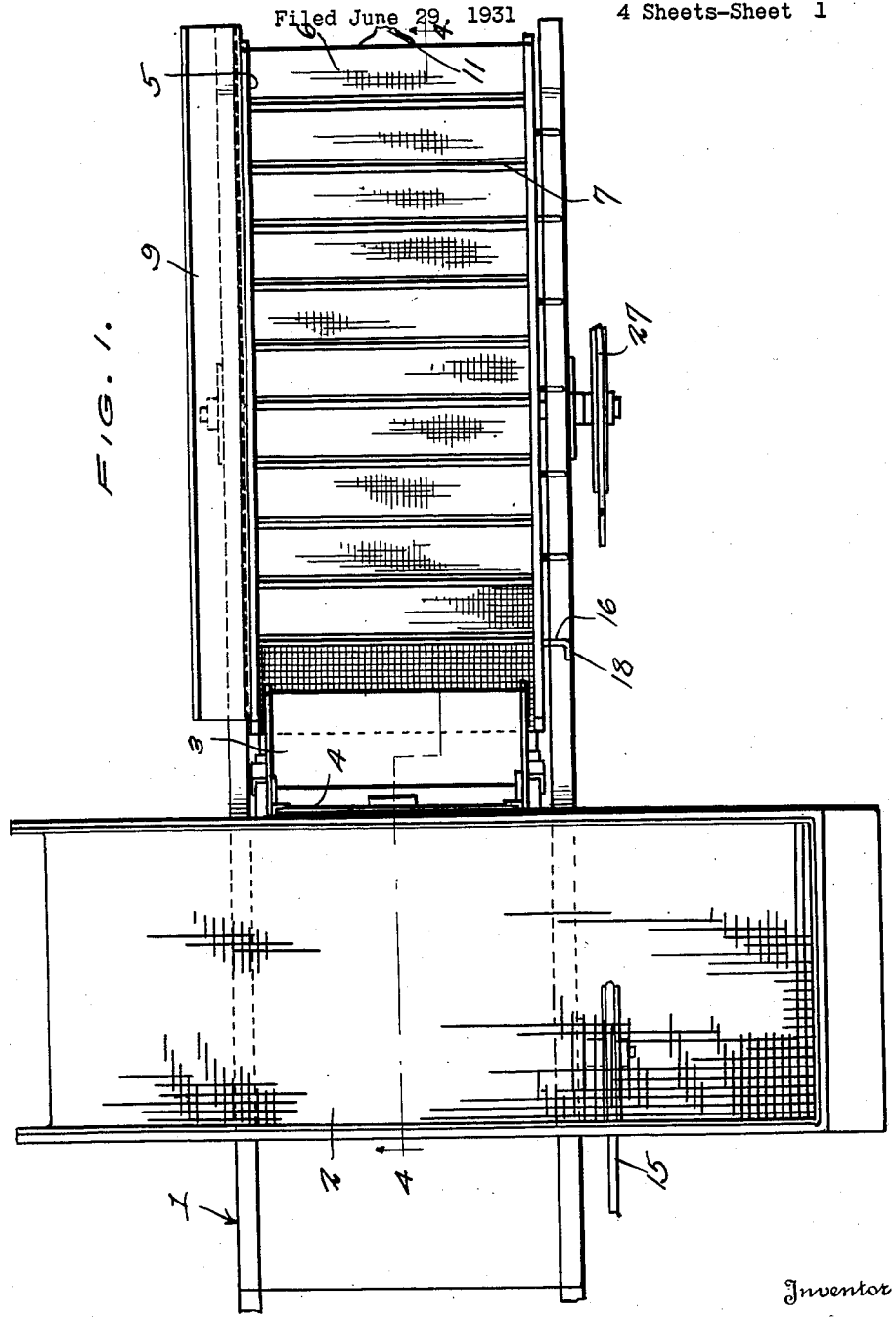
Inventor
JAMES F. GIBSON
By C. A. Snow & Co.
Attorneys.

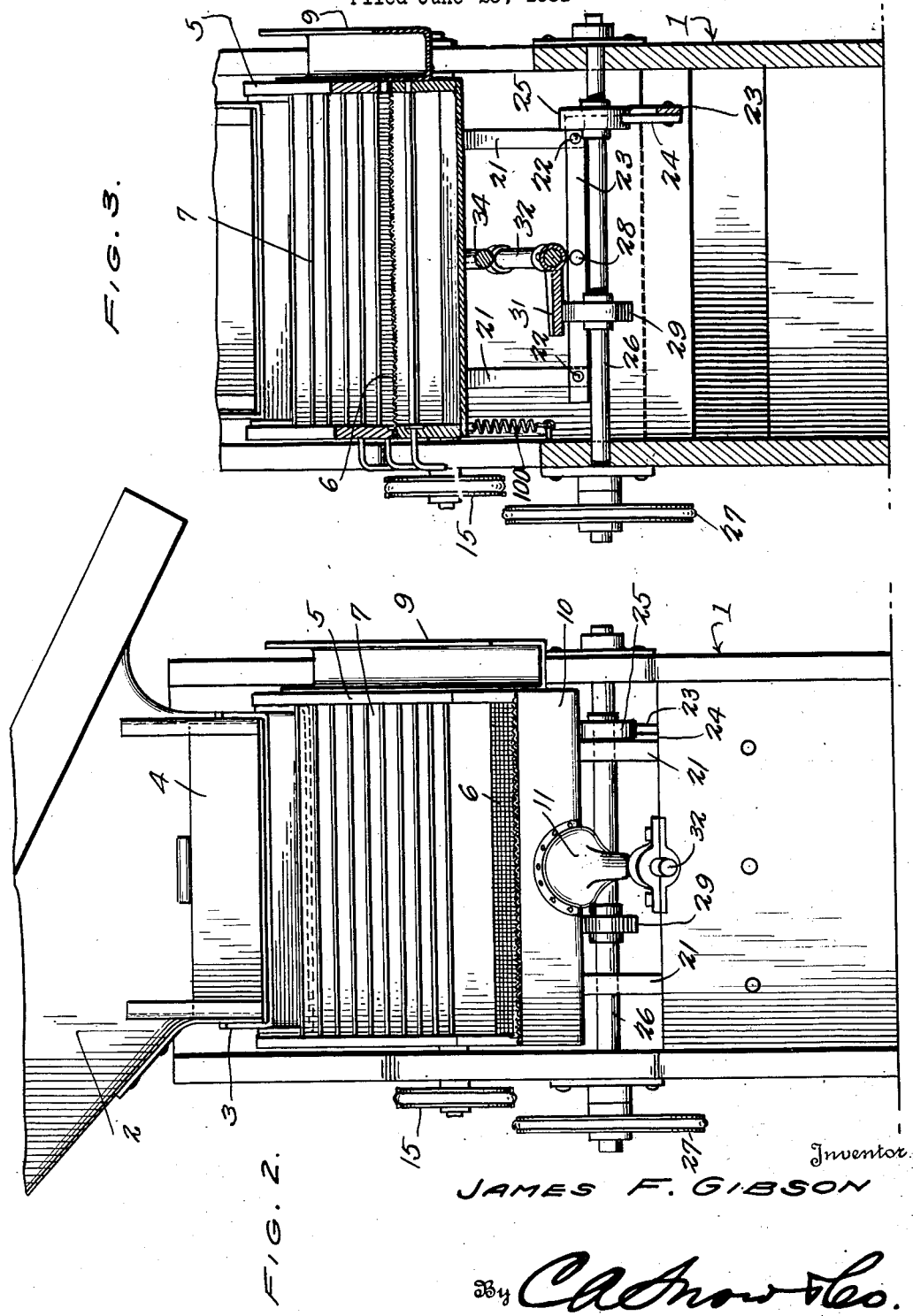

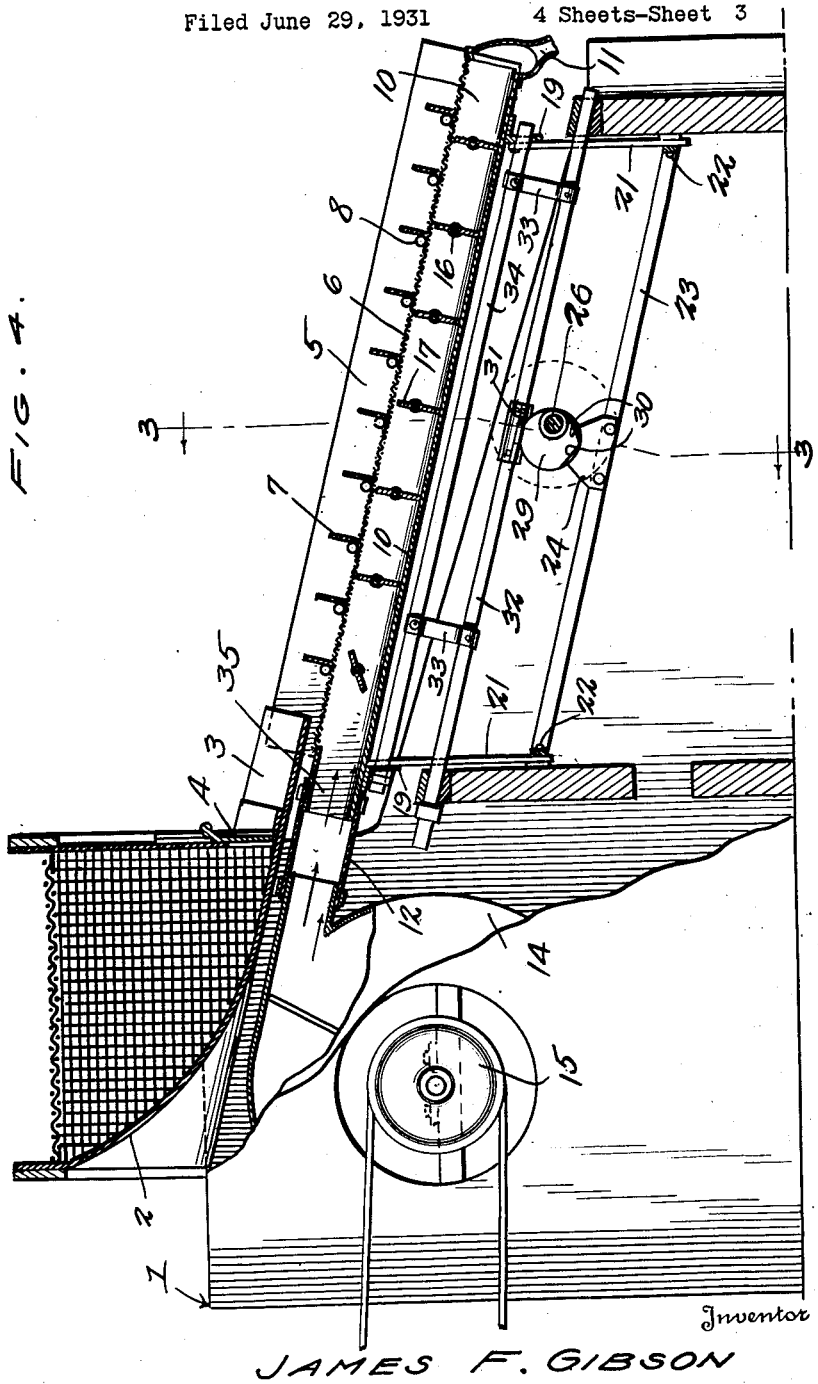

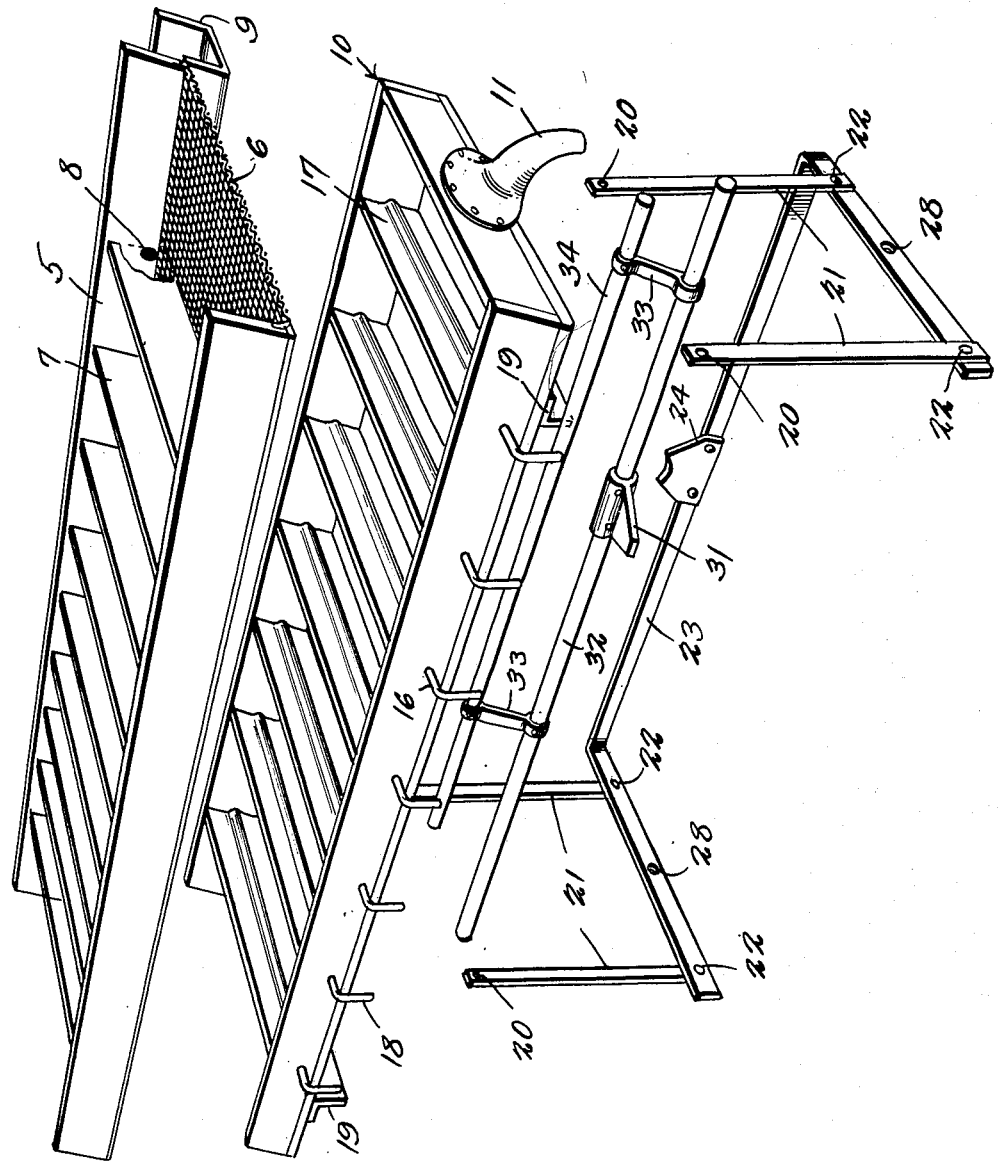

Patented Feb. 6, 1934

1,945,526

UNITED STATES PATENT OFFICE 1,945,526

AUTOMATIC DRY CONCENTRATOR

James Franklin Gibson, Tucson, Ariz.

Application June 29, 1931. Serial No. 547,721

1 Claim. (Cl. 209—504)

This invention aims to provide novel means for separating flower gold, black iron concentrates, or magnetic iron sand, from the material in which the gold, or similar substances, are carried, novel means being provided for segregating both the coarse and the fine material, and novel means being provided for directing an air blast upwardly through the screen over which the material travels initially.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows a top plan, a device constructed in accordance with the invention;

Figure 2 is an end elevation;

Figure 3 is a transverse section on the line 3—3 of Figure 4;

Figure 4 is a longitudinal section on the line 4—4 of Figure 1;

Figure 5 is a composite perspective view showing the apron, the pan, and the actuating parts therefor.

In carrying out the invention, there is provided a support 1 carrying a hopper 2 discharging through a spout 3, under the control of a gate 4. The separator mechanism of the device comprises a downwardly-inclined apron 5, having a screen bottom 6, on which the spout 3 discharges. Riffles 7 extend across the apron 5. In one side of the apron 5 there are holes 8 located in advance of the riffles 7, and at the lower ends of the riffles, the holes discharging into a conveyor 9, such as a trough, mounted upon one side of the apron 5.

A pan 10 is located below the apron 5 and is secured tightly to the apron. The pan 10 is closed at its sides, and the bottom 6 of the apron 5 forms the top of the pan. At the lower end of the pan 10 there is an outlet 11. At the upper end of the pan 10 there is a nipple 35, connected by a flexible tube 12 to a blower 14 located within the support 1, the numeral 15 designating any suitable means for driving the blower.

Shafts 16 extend transversely out of the pan 10, and are mounted for rocking movement in the sides of the pan. The shafts 16 carry baffle plates 17 located in the pan 10. On the outer ends of the shafts 16 there are handles 18, whereby the shafts may be rotated, to dispose the baffle plates 17 at different angles, the baffle plates remaining in the positions to which they have been adjusted by an operator.

The pan 10 is provided near to its ends with transverse, depending brackets 19. The upper ends of links 21 are pivoted at 20 to the brackets 19. The lower ends of the links 21 are pivoted at 22 to a horizontally disposed, U-shaped frame 23. The frame 23 is pivoted at its ends, as shown at 28, at a point midway between its sides, to the support 1, and the links 21 are located on opposite sides of the pivot point 28.

On one side of the frame 23 there is a bracket 24, adapted to cooperate with a first eccentric 25 on a first or transverse shaft 26, journaled in the support 1 and operated by any suitable means, indicated at 27. The shaft 26 carries a second eccentric 29 having flat portions 30, disposed at an angle to each other. The second eccentric 29 cooperates with a substantially horizontal arm 31 on a second longitudinal shaft 32 mounted to rock on the support 1, and the arm is held in operative relation to the eccentric by any conventional spring means, indicated at 100 in Fig. 3. The shaft 32 carries brackets 33 in which a rod 34 is secured, the rod 34 and the brackets 33 constituting the crank arm on the shaft 32, the ends of the rod 34 being journaled in the brackets 19 on the bottom of the pan 10.

In practical operation, the material cast into the hopper 2 flows through the spout 3, under the control of the gate 4, upon the screen bottom 6 of the apron 5, at the upper end of the apron. The heavy, coarse gold or other metals which catch behind the riffles 7 work out through the holes 8 into the conveyor 9, from which the coarse material runs into a suitable receptacle, or is taken care of otherwise. The flower gold with black sand concentrates will work through the screen 6 into the pan 10, and will be delivered out of the spout 11. The blast of air, proceeding from the blower 14, will pass longitudinally of the pan 10, beneath the screen 6. The blast of air, directed upwardly by the baffle plates 17 will pass through the screen 6, and keep loose the material that is traveling downwardly along the screen 6. The baffle plates 17 may be set at any desired angle, by means of the shafts 16 and handles 18, so as to direct the air more or less upwardly through the screen 6, the force of the air, as it travels upwardly through the screen, being regulated, according to the condition of the material that is moving downwardly along the screen.

When the shaft 26 is rotated by the means shown at 27, the eccentric 29 cooperates with the arm 31 on the shaft 32, to impart rocking movement to the shaft, and the arm 33—34 on the shaft 32 imparts a horizontal component to the movement of the separator composed of the apron 5 and the pan 10. When the shaft 26 is rotated, as aforesaid, the eccentric 25 on the shaft cooperates with the member 24 on the frame 23, to impart tilting movement to the frame, the frame actuating the links 21, and the links 21 giving an up and down component to the movement of the separator.

As the arm 31 and the shaft 32 move up and down, responsive to the eccentric 29, the arm moves over the flat surfaces 30, and a definite and positive knock is given to the arm 31, and a sudden movement is imparted to the separator, in its transverse swinging movement.

The device is simple in construction, but it will be found thoroughly effective for the purposes stated.

What is claimed is:—

In a concentrator of the class described, a support, a separator movable with respect to the support, a transverse shaft journaled on the support, first and second eccentrics on the shaft, a longitudinal shaft journaled on the support, a substantially vertical arm on the longitudinal shaft, means for connecting the arm to the separator, a substantially horizontal arm on the longitudinal shaft and cooperating with the second eccentric to impart a horizontal component to the movement of the separator, means for maintaining the arms in operative relation to the eccentrics, a frame pivoted to the support for rocking movement about an axis disposed longitudinally of the separator, links located on opposite sides of the longitudinal shaft and pivoted to the frame and to the separator, and means on the frame for cooperation with the first eccentric, to impart a vertical component to the movement of the separator.

JAMES FRANKLIN GIBSON.